July 7, 1964

E. A. HAASE 3,140,324

FUEL SUPPLY SYSTEM

Filed Feb. 6, 1961

INVENTOR.
ELMER A. HAASE
BY
ATTORNEY

INVENTOR.
ELMER A. HAASE
BY
*James L. O'Brien*
ATTORNEY

United States Patent Office 3,140,324
Patented July 7, 1964

3,140,324
FUEL SUPPLY SYSTEM
Elmer A. Haase, South Bend, Ind., assignor to The Bendix Corporation, South Bend, Ind., a corporation of Delaware
Filed Feb. 6, 1961, Ser. No. 87,471
6 Claims. (Cl. 261—42)

The present invention relates generally to a system for controlling the flow of one fluid in proportion to the flow or mass of another fluid and more particularly to a fuel supply system for supplying fuel under pressure to a combustion engine.

The present invention utilizes a servo regulator and is an improvement over charge forming devices of the non-servo, pressure feed type such as the Stromberg Injection Carburetor disclosed in U.S. Patent No. 2,361,227 to F. C. Mock and assigned to the assignee of the present invention. In the Mock device the regulator handles the entire fuel flow to the engine, i.e., all of the fuel from the inlet passes through the regulator valve. In carburetors of this type the main fuel valve or regulator valve is basically a pressure reducing valve which varies the unmetered fuel pressure as a function of air flow, and has to control fuel flows which vary from idling to maximum in a ratio of approximately 50–1—an extremely wide range of operation for precise control, even where all the forces involved are steady. Since the main fuel valve must be made large enough to pass the maximum fuel flow required for maximum power output of the engine, it has a certain inherent inertia and friction that produce a certain amount of hysteresis in the regulator which adversely affects the repeatability and accuracy of such a regulator during engine operations wherein the fuel requirements are varied substantially. The same inertia and friction also reduces the ability of the regulator to move with sufficient precision and steadiness to satisfactorily control the relatively small fuel flow required for idling operation.

A further disadvantage of injection carburetors of the type mentioned above is that the metering jets are downstream of the regulating valve so that the valve must regulate unmetered fuel pressure to compensate for inlet fuel pressure variations.

It has previously been proposed to overcome some of the disadvantages of the injection carburetor through the use of a servo regulator system such as is disclosed and claimed in my copending application Serial No. 760,326, filed September 11, 1958, now Patent No. 3,007,684. This servo system, however, requires a servo return line to the fuel tank or source of fuel. This is objectionable in adding complexity to the system installation and in adding substantially to the cost of the installed system. This feature is particularly objectionable where the system is installed in aircraft having a plurality of fuel tanks since means must be provided to selectively connect the servo return line to the tank in use.

It is an object of the present invention to provide a servo regulator for a fuel supply system or fluid proportioner which does not require a servo return line.

Another object of the invention is to provide a fluid supply regulator having fast response to change in the regulator control parameters.

A further object of the invention is to provide improved means for supplying the fuel requirements of an engine during acceleration.

A still further object of the invention is to provide a fuel supply system having relatively few parts and being relatively inexpensive to manufacture and which is reliable in operation.

These and other objects and advantages of the invention will be apparent to one skilled in the art from the following detailed description taken in connection with the appended drawings in which.

Figure 1:
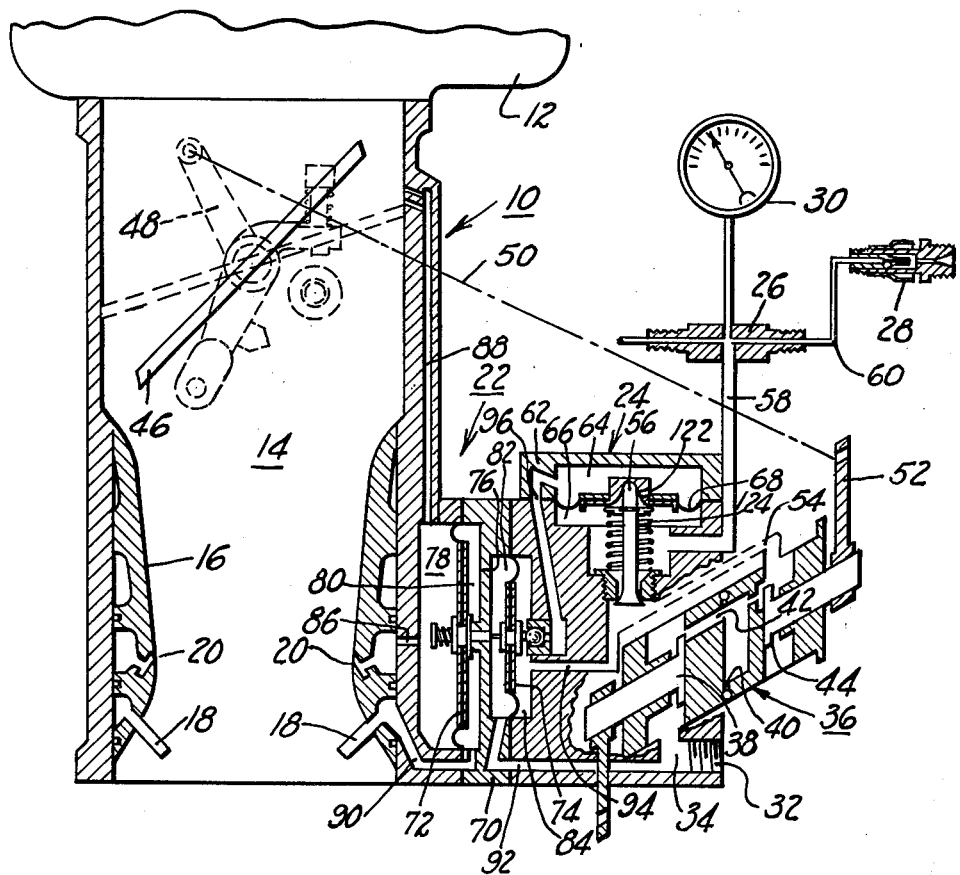
FIGURE 1 is a schematic view of a fuel supply system embodying the present invention.

Referring now to the drawings and more particularly to FIGURE 1, numeral 10 designates a fuel supply system for a combustion engine 12 having an induction passage or air duct 14. A venturi 16 is disposed in the induction passage to create a pressure differential at spaced points therein viz., the in impact tubes 18 and throat 20.

The fuel supply system 10 includes a servo regulator 22, metering section 24, flow divider 26, discharge nozzles 28 and flow meter 30. Fuel under pressure from a source (not shown) is supplied to system inlet 32 thence via conduit 34 to metering means 36 which includes a mixture control plate 38 having a plurality of metering restrictions 40 adapted for selective registration with a conduit 42. An idle control plate 44 operatively connected to induction passage throttle 46 by means of levers 48, 50 and 52 is adapted for registration with conduit 42 to control the flow therethrough during idle operation of the engine. Metered fuel from conduit 42 passes through conduit 54, control valve 56 and conduit 58 to flow divider 26 and thence through discharge conduits 60 for ultimate discharge through nozzles 28. In a preferred embodiment the nozzles 28 discharge into the induction passage of the engine and one nozzle is provided for each cylinder of the engine. It is to be understood, however, that the number of nozzles and their discharge location may be varied and that in the event a single nozzle is used, the flow divider 26 may be omitted.

The metering section 24 is provided with a housing 62 the interior of which is divided into first and second fuel chambers 64 and 66, respectively by a diaphragm or movable wall 68 which engages control valve 56.

The servo regulator 22 is provided with a casing or housing 70 containing first and second diaphragms or movable walls 72 and 74 which together with a rigid partition 76 interposed between them provide first and second air chambers 78 and 80, respectively, and unmetered and metered fuel chambers 82 and 84, respectively. Chamber 78 is connected to throat 20 by means of passage 86 and to the induction passage downstream of throttle valve 46 by means of passage 88. Chamber 80 is connected to impact tubes 18 by means of passage 90. The differential between the pressures in chambers 78 and 80 produces a force indicative of the air or fluid flow in duct 14 tending to move diaphragm 72 to the left as viewed in FIGURE 1. Chamber 82 is connected to fuel inlet 32 by means of conduits 92 and 34. Chamber 84 is connected to metered fuel conduit 54 by means of conduit 94. Chamber 84 is also connected to chamber 64 in metering section 24 by means of passage 96. The flow from chamber 84 to passage 96 is controlled by a spherical valve 98 fixedly secured to a protruding end of a retaining member 99 by any suitable means such as a weld or the like. The retaining member 99 is provided with annular flange 101 which extends through a central opening in movable wall 74 and which is crimped at its radially outermost edge to thereby fixedly secure the retaining member 99 to movable wall 74.

Figure 2:
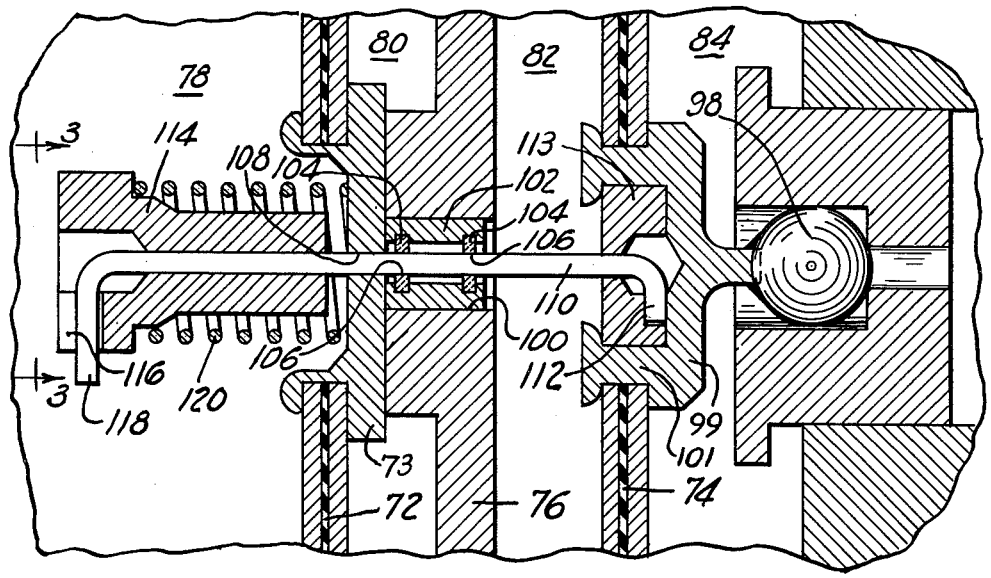
FIGURE 2 is an enlarged view of the regulator shown in FIGURE 1.

As best seen in FIGURE 2, partition 76 is provided with a bore 100 in which a bearing 102 is mounted.

Figure 4:
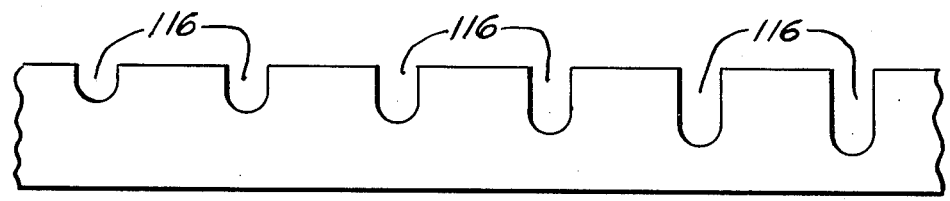
FIGURE 4 is a developed view taken along line 4—4 of FIGURE 3.
Figure 3:
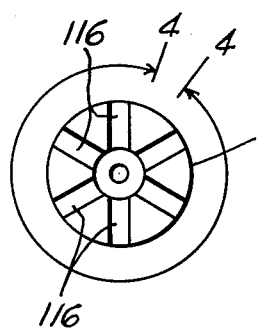
FIGURE 3 is a view taken in the direction of arrows 3—3 of FIGURE 2.

Bearing 102 is provided with a pair of jeweled bearing members 104 formed with a close tolerance central bore 106. The jewel bearings may be made of synthetic sapphires, rubies or the like. Movable wall 72 is provided with a centrally located member 73 fixedly secured thereto which member 73 has a bore 108 formed therein coaxial with bore 106. A rod 110 formed of high strength spring wire is reciprocably mounted in bores 108 and 106 and is provided with a bent end 112 which is fixedly secured to retaining member 99 by a washer-like member 113. The radially innermost edge of annular flange 101 is crimped into engagement with washer-like member 113 to thereby confine washer-like member 113 within annular flange 101. A bushing 114 in chamber 78 is reciprocably mounted on rod 110 and is provided with a plurality of radially extending slots or grooves 116 of different depths (as best seen in FIGURES 3 and 4). Rod 110 is formed with a turned over portion 118 which is adapted for selective engagement in one of the grooves 116. A spring 120 disposed between bushing 114 and member 73 urges the bushing 114 outwardly away from the wall 72 in a direction to open valve 98. Bushing 114 is spaced a predetermined amount from member 73 so that as wall 72 is moved to the left under the influence of the differential pressures between the pressures in chambers 78 and 80 the member 73 engages bushing 114 thereby rendering spring 120 ineffective.

The differential in pressures between the unmetered fuel pressure in chamber 82 and the metered fuel pressure in chamber 84 urges the diaphragm 74 to the right as viewed in FIGURE 1 to close valve 98.

The diaphragm 72 and 74 seek a position wherein the forces acting on the diaphragms are balanced and in so doing position servo valve 98 to control the flow of servo fuel through passage 96, chamber 64 and calibrated passage or bleed 122 formed in movable wall 68 to chamber 66.

In operation fuel from the inlet is metered by means 36 from whence a portion of the metered fuel flows via conduit 54 through control valve 56 into chamber 66. Another portion of the metered fuel flows to chamber 84 in the servo regulator section 22 thence through servo valve 98 to chamber 64 and through calibrated passage 122 to chamber 66. The position of servo valve 98 is determined as a function of the differential in air or fluid pressure in the induction passage and of the differential in fuel pressure on opposite sides of the metering restriction. It is to be noted that the servo regulator automatically compensates for variations in inlet fuel pressure in that servo pressure varies directly with variations in the inlet pressure which effects a corresponding change in metered fuel pressure whereby the metered head or pressure drop across the metering restriction remains constant with changes in inlet fuel pressure.

During idling, when the flow through the induction passage is low and subject to fluctuations, sufficient and/or accurate force may not be available to properly operate diaphragm 72 of the servo regulator. During the idle operation condition of low air flows, idle spring 120 produces a force on bushing 114 which tends to open the servo valve 98. Spring 120 is of relatively low rate so as to produce a substantially constant force within its range of operation. When the air differential pressures acting on diaphragm 72 have reached a predetermined value, the lost motion in the one-way connection between bushing 114 and member 73 is taken up to form in effect a solid link between bushing 114 and diaphragm 72 thus rendering spring 120 ineffective.

The servo regulator 22 controls the servo fuel pressure during normal operations as a function of the pressure differentials applied to diaphragms 72 and 74 and during idle operation as a function of the force of spring 120 which is transmitted to chamber 64 to act on diaphragm 68 in a direction to urge control valve 56 toward open position. The control valve 56 is urged toward closed position by spring 124 and the fuel pressure in chamber 66. The servo fuel in chamber 64 passes through calibrated passage 122 into chamber 66 for transmission to the discharge nozzles 28. Thus there are no return lines for returning the servo fuel to the fuel tank or source of fuel. It is to be noted that when the fuel flow to the engine is increased the servo pressure in chamber 64 causes the movable wall 68 to move downwardly to further open control valve 56 and at the same time forces some of the fuel from chamber 66 into the discharge line 58. Thus the operation of the control valve 56 to increase fuel, automatically includes the development of an accelerating charge of fuel by the downward movement of diaphragm 68.

The jewel bearings 104 in partition 76 are commercially available to very accurate dimensions at low cost. Likewise, spring wire used for rod 110 is also available commercially to very accurate dimensions. The disposition of rod 110 in bearings 104 provides a good seal between chambers 80 and 82 with very low cost construction and with very low friction characteristics. The use of bushing 114 with variable depth grooves provides a simple, accurate and low cost means for adjusting the connection between diaphragms 72 and 74 to compensate for differences in manufacturing tolerances. To change the effective length of rod 110 it is only necessary to depress bushing 114 against spring 120 and rotate it to position a different groove in registration with turned over portion 118 of rod 110.

It is to be noted that the metering means 36 in the metering section 24 receives fuel at the highest pressure in the system, inlet fuel pressure. The fuel pressure drop in the metering section 24 occurs at the metering restrictions. This arrangement reduces the tendency of fuel to vaporize such as is the case when the control valve is placed upstream of the metering restriction.

It is also to be noted that the flow regulator 22 requires very small fuel and air differential pressures to operate the servo valve 98. Flow of servo fuel need only to be a small amount whereby the air and fuel diaphragms are required to move only slightly such as in the order of a few thousandths of an inch. Due to the small movement of the diaphragms, means effective area changes of the diaphragm and spring forces of the diaphragms are negligible. Also due to the small air pressure differential required to operate the air diaphragm 72, the air induction passage may be opened up so that the venturi constitutes a less restriction than in the prior art devices to thereby permit better breathing and increased air flow to the engine.

Although the invention has been described with reference to the particular embodiments disclosed in the drawings it will be apparent that many changes or rearrangement of the parts may be made without departing from the spirit of the invention. In particular, although the invention is particularly adapted for use in supplying fuel to a combustion engine as specifically set out above, the invention has utility in controlling the supply of one fluid in proportion to the flow of another fluid and may by example be used in the petroleum industry for controlling the discharge of deicer fluid into a conduit carrying gasoline or blending fluid chemical compositions in any proportions.

I claim:

1. A fuel supply system for a combustion engine having an air duct comprising, a conduit for supplying fuel to the engine, metering means in said conduit, a control valve in said conduit downstream of said metering means, first and second fuel chambers, a pressure responsive movable wall operatively connected to said control valve and disposed to separate said fuel chambers, means for communicating fuel from said conduit downstream of said control valve to said first fuel chamber, passage means connecting said conduit intermediate said metering means and said control valve to said second fuel chamber, a calibrated passage connecting said first and second fuel chambers, a servo valve controlling the flow through said passage means, a housing, first and second air chambers formed in said housing, metered and unmetered fuel chambers formed in said housing, first and second pressure responsive movable walls respectively separating said air chambers and said metered and unmetered fuel chambers, rigid wall means in said housing separating said second air chamber from said unmetered fuel chamber, a bore in said rigid wall means, a bushing in said first air chamber having a one way connection with said first movable wall, a plurality of radially extending grooves of different depths formed in said bushing, an aperture formed in said first movable wall, a rod reciprocably mounted in said bore, said bushing, and said aperture and operatively connected at one end to said second movable wall, said rod being formed at the other end thereof with a turned over portion adapted for selective engagement in one of the grooves in said bushing, means operatively connecting said second movable wall to said servo valve, means for creating a pressure differential at spaced points in said air duct, means respectively connecting said first and second air chambers to said spaced points, means connecting said unmetered fuel chamber to said conduit upstream of said metering means and means communicating fuel from said conduit downstream of said metering means to said metered fuel chamber.

2. In a fuel control apparatus for a combustion engine, a fuel conduit for transmitting fuel to the engine, metering means in said conduit, a control valve in said conduit downstream of said metering means, a housing, a movable wall in said housing operatively connected to said control valve and dividing the interior of said housing into first and second chambers, passage means connecting said first and second chambers, passage means communicating said first chamber with said conduit downstream of said control valve, passage means including a first fuel chamber connecting said second chamber to said conduit intermediate said metering means and said control valve, a servo valve operatively connected to said last named passage means downstream from said first fuel chamber for controlling the flow through said last named passage means, a second fuel chamber, a passage communicating said second fuel chamber with said conduit upstream of said metering means, a movable wall separating said first and second fuel chambers and operatively connected to said servo valve and resilient means urging said control valve toward closed position.

3. In a fuel control apparatus for a combustion engine, a fuel conduit for supplying fuel to the engine, metering means in said conduit, a control valve in said conduit downstream of said metering means, passage means including a calibrated passage connected to said conduit intermediate said metering means and control valve and to said conduit downstream of said control valve, a servo valve in series flow with said calibrated passage for controlling the flow through said passage means, means responsive to the pressure differential existing in said conduit across said metering means for controlling said servo valve, a movable wall operatively connected to said control valve for controlling the operation of the same, said wall having opposite sides, a first fluid connection between one of said opposite sides and said passage means between said servo valve and said calibrated passage and a second fluid connection between the other of said opposite sides and said conduit downstream of said control valve, said movable wall being responsive to the fluid pressure differential across said calibrated passage.

4. A fuel supply system for a combustion engine having an air duct comprising a conduit for supplying fuel to the engine, metering means in said conduit, a valve in said conduit downstream of said metering means, a pair of fuel chambers, a pressure responsive movable wall separating said chambers, said wall being operatively connected to said valve, means for communicating fuel from said conduit downstream of said valve to one of said chambers, passage means connecting the other of said chambers to said conduit intermediate said metering means and said valve, a calibrated passage in said movable wall connecting said chambers, and means responsive to the differential in pressure at spaced points in said air duct and to the differential in pressure on opposite sides of said metering means for controlling the flow through said passage means.

5. In a regulator assembly for a supply system, a casing, substantially coaxial parallel differential-pressure, first and second diaphragms mounted in said casing, a substantially rigid partition interposed between said diaphragms and in conjunction with the diaphragms and the casing providing four chambers, a bushing in one of the extremital chambers having a one way connection with said first diaphragm, a plurality of radially extending grooves of different depths formed in said bushing, coaxial bores formed in said partition and first diaphragm, a rod reciprocably disposed in said bores and operatively secured at one end to said second diaphragm, said rod having a turned over portion at the opposite end adapted for selective engagement with one of the grooves in said bushing and resilient means urging said bushing axially outwardly from said first diaphragm.

6. In a fluid proportioning apparatus for controlling the supply of a first fluid to a duct carrying a second fluid, a conduit for supplying said first fluid to said duct, metering means in said conduit, a valve in said conduit downstream of said metering means, a pair of chambers, a pressure responsive movable wall separating said chambers, said wall being operatively connected to said valve, means for communicating fluid from said conduit downstream of said valve to one of said chambers, passage means connecting the other of said chambers to said conduit intermediate said metering means and said valve, a calibrated passage connecting said chambers, means in said duct for creating a differential between two first fluid pressures which vary with variations in first fluid flow through said duct, and means responsible to said differential and to the differential between the pressures of said second fluid on opposite sides of said metering means for controlling the flow through said passage means.

References Cited in the file of this patent

UNITED STATES PATENTS

| | | |
|---|---|---|
| 2,361,227 | Mock | Oct. 24, 1944 |
| 2,626,137 | Tapley | Jan. 20, 1953 |
| 2,809,022 | Chandler | Oct. 8, 1957 |
| 2,899,948 | Groves | Aug. 18, 1959 |
| 3,007,684 | Haase | Nov. 7, 1961 |